Aug. 7, 1956
F. S. FLICK
2,757,993
PISTON AND CYLINDER SEAL PACKING
Filed July 2, 1953
2 Sheets-Sheet 1
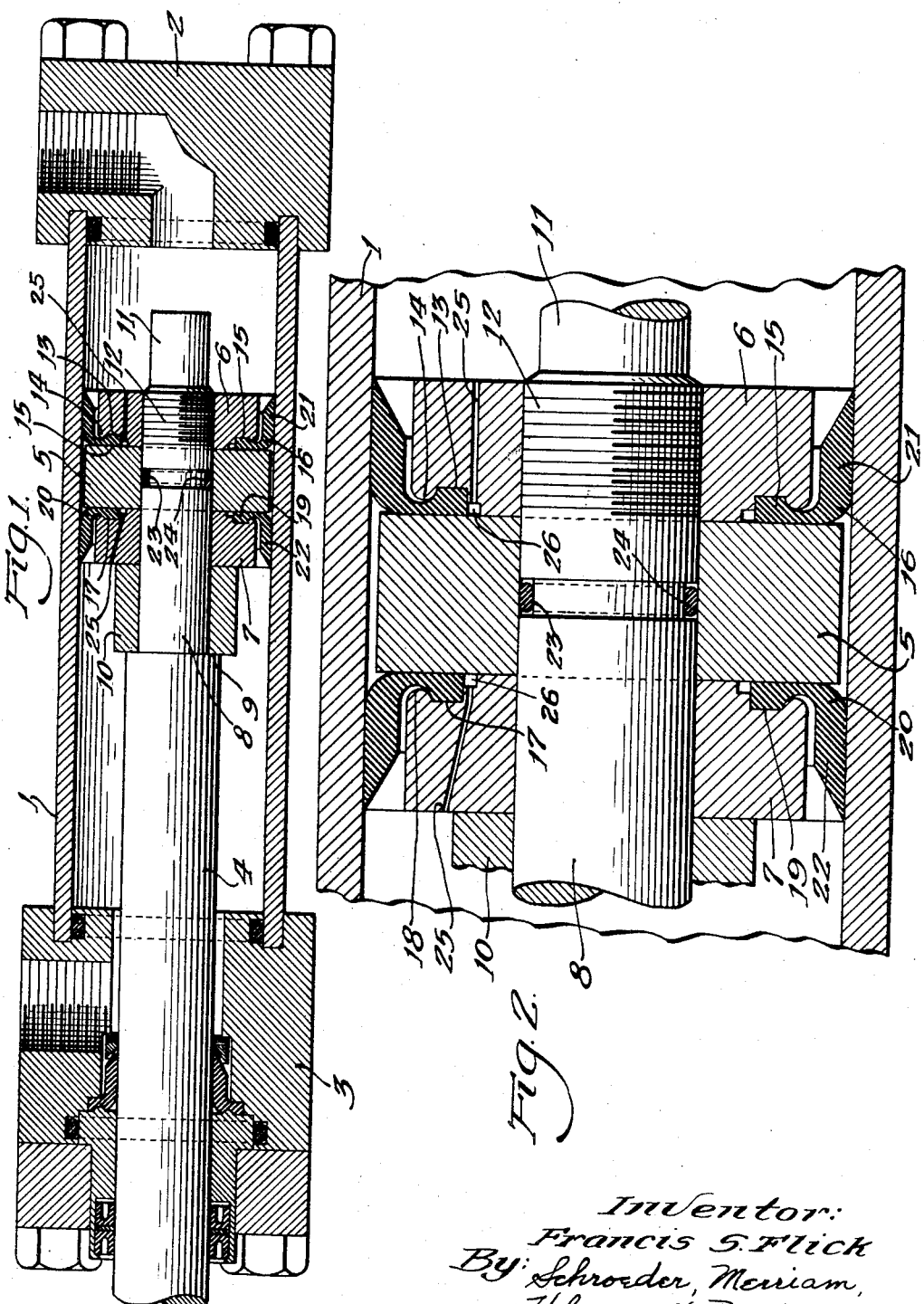
Inventor:
Francis S. Flick
By: Schroeder, Merriam,
Hofgren, & Brady
Attorneys Aug. 7, 1956    F. S. FLICK    2,757,993
PISTON AND CYLINDER SEAL PACKING
Filed July 2, 1953    2 Sheets-Sheet 2

Inventor:
Francis S. Flick
By Schroeder, Merriam,
Hofgren & Brady
Attorneys

United States Patent Office 2,757,993
Patented Aug. 7, 1956

2,757,993
PISTON AND CYLINDER SEAL PACKING

Francis S. Flick, Melrose Park, Ill., assignor, by mesne assignments, to Flick-Reedy Corporation, a corporation of Illinois Application July 2, 1953, Serial No. 365,657

12 Claims. (Cl. 309—4)

This invention relates to a piston assembly and more particularly to a piston assembly for high pressure cylinders using hydraulic pressure, air pressure, or other suitable pressure medium, and having piston cup seals with means for preventing the cup seal from blowing out either on the low pressure side or the high pressure side of the piston.

This application is a continuation-in-part application of my copending application Serial No. 62,752, filed November 30, 1948, and now abandoned.

In piston cup seals in high pressure cylinders prior to my invention, and particularly in the type in which the piston is made up of a piston disk having a follower disk clamped on one or each side thereof with the base of each cup seal gripped between a follower disk and the piston disk, it has often occurred that leakage of pressure medium between the piston parts would accumulate behind the inside diameter of the base of the cup seal, and upon release of the high pressure said accumulated pressure medium being under compression would expand and after such repeated expansions would ultimately cause the cup seal to blow out; and also pressure medium leaking through from one side of the piston to the other would accumulate behind the inside diameter of the base of the cup seal on said other side and cause the cup seal to blow out. Blow out of cup or flange seals used between a cylinder head and the piston rod has also been a problem. This I have prevented in the present invention.

Among the objects of my invention are: to provide a novel and improved piston assembly; to provide a piston assembly having cup seals and means for preventing the cup seals from blowing out; to provide means for relieving excess pressure from behind the inside diameter of the base of the cup seal; to provide means in a piston assembly for preventing pressure from the high pressure side of the piston from leaking through between the piston parts to the inside diameter of the base of the cup seal on the low pressure side of the piston and blowing out the cup seal; to provide means for relieving to the low pressure side of the piston any excess pressure that may have built up behind the inside diameter of the base of the cup seal during the time that that side of the piston was subjected to high pressure; to relieve accumulated pressure at the base of cup seals in high pressure applications generally; and such further objects, advantages and capabilities, inherently possessed by my invention, as will later more fully appear.

The invention is illustrated in a preferred embodiment in the accompanying drawing, in which:

Fig. 1 is a longitudinal central section through a high pressure cylinder having a piston assembly therein embodying my invention;

Fig. 2 is a fragmentary enlarged longitudinal section through the piston assembly;

Figure 3:
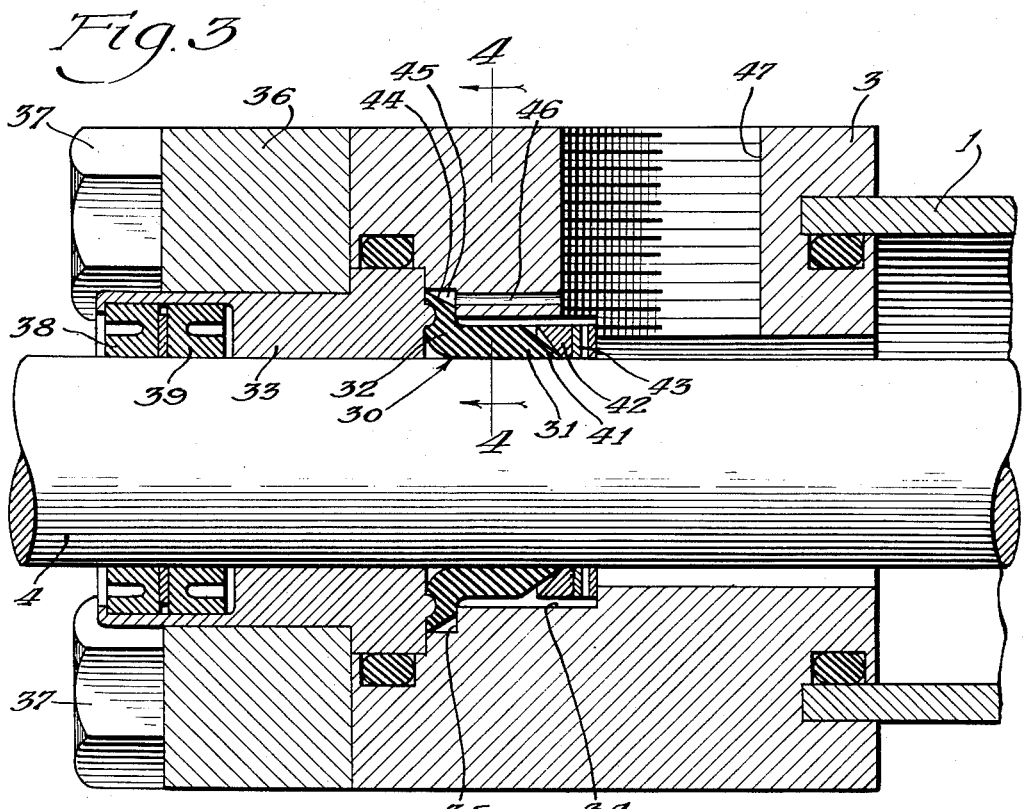
Fig. 3 is a longitudinal central section similar to Fig. 1 taken through the front cylinder head.

In the embodiment shown in Figs. 1 and 2 of the drawing, for illustrative purposes, the cylinder 1 is provided at its respective ends with a rear cylinder head 2 and a front cylinder head 3, within the latter one of which is respectively mounted a piston rod 4 having fixed at its rear end a piston assembly embodying the present invention, and which piston assembly is mounted for reciprocation within the cylinder 1. This piston assembly comprises a piston disk 5 having positioned against its rear and front sides the follower disks 6 and 7, these parts each being formed with a central bore closely fitting upon the rear reduced diameter portion 8 of the piston rod 4. Positioned between the front face of follower disk 7 and the shoulder 9 of the piston rod is a spacer sleeve 10. The extreme rear end of the piston rod is formed with an end portion 11 of smaller diameter than the portion 8, portion 8 immediately in front of the reduced portion 11 being formed with screw threads 12 upon which are threadably mounted complemental threads formed in the wall of the bore of the rear follower disk 6. It is thus seen that when the spacer sleeve 10, the front follower disk 7, the piston disk 5 and the rear follower disk 6 are placed upon the piston rod portion 8 they may be tightly clamped together by rotating the rear follower disk 6 upon the threads 12 of the reduced portion 8 of the piston rod.

As seen in Figs. 1 and 2 the outer marginal portion of the inner side face of the rear follower disk 6 is formed with an annular cut-away portion 13 having a rounded flange 14 to provide an annular space in which the inside portion of the base 15 of the cup seal 16 is mounted and tightly gripped between the rear follower disk and the rear face of the piston disk 5. The term rear is used to indicate the right hand end of Fig. 1 and the term front to indicate the left hand end of Fig. 1. A similar cut-away portion 17 having a similar flange 18 is formed on the rear face of the front follower disk 7 to provide a space within which the inside portion of the base 19 of the front cup seal 20 is clamped between the front follower disk 7 and the piston disk 5. As will be understood the rear cup seal 16 is provided with a rearwardly extending lip or pressure member 21 having sliding contact with the inner surface of the cylinder. Likewise the cup seal 20 is provided with a forwardly extending lip or pressure member 22 which is also in slidable contact with the inner cylinder wall. The free end of the lip of each of the cup seals is formed with a beveled toe.

In order to prevent leakage of pressure medium that might occur between any of the contacting parts, from passing from the pressure side of the piston to behind the inside diameter of the base of the cup seal on the non-pressure side of the piston, there is formed in the outer circumference of the reduced portion 8 of the piston rod, an annular groove 23, preferably rectangular in cross section, this groove being positioned preferably midway of the length of the bore in the piston disk 5. Prior to assembly of these parts an O ring 24 is positioned in groove 23 so that when the parts are assembled this O ring will be tightly sealed between the wall of the bore in the piston disk 5 and the piston rod, so that should there be any tendency of leakage of pressure medium from the pressure side of the piston toward the inside diameter of the base of the cup seal on the non-pressure side of the piston, this will be prevented by the sealing ring 24, thus eliminating any possibility of the cup seal on the non-pressure side of the piston from being blown out by leakage of pressure medium from the opposite side of the piston. While sealing ring 24 is shown as being opposite the bore of the piston disk 5 it will be understood that a sealing packing may be located at any other position desired, just so that it prevents passage of pressure medium from the high pressure side of the piston to the inside diameter of the cup seal on the low pressure side of the piston. For clarity this O ring has been shown in section in Figs. 1 and 2.

While any suitable fluid pressure means may be used as desired, and referring, for illustrative purposes only, to oil, which under high pressure is compressible, it has, prior to the present invention, been objectionable that some of the oil would leak through between the parts and gradually accumulate behind the inside diameter of the base of the cup seal on the high pressure side of the piston. This accumulated oil being under high pressure and correspondingly compressed, would, upon release of the pressure on the high pressure side of the piston, expand and exert a radially outward pressure against the base of the cup seal, which under continuing operation of the piston would ultimately cause the cup seal to blow out on the high pressure side of the piston upon the release of the pressure thereagainst. This I have prevented in the present invention by forming in each of the follower disks a small opening 25 leading from the annular collecting channel 26 formed immediately underneath the inside diameter of the base of the cup seal. This collecting channel 26 serves to collect any of the oil or other pressure medium that tends to accumulate behind said cup seal base, which collected pressure medium would be vented through the opening 25 on the high pressure side of the piston upon release of the high pressure on that side of the piston.

Also should the O ring 24 for any reason become defective through damage or otherwise so as to let any of the high pressure medium leak past the same so as to enter the collecting channel 26 on the other side, it would be vented through the opening 25 when said other side was not subjected to high pressure. The cup seals are each formed of a suitable flexible material such as leather, rubber, synthetic rubber, or the like. It is thus seen that I have provided an effective means for preventing the pressure medium from the high pressure side of the piston from leaking through any of the contacting surfaces and blowing the cup seal out, on either side of the piston. As will be understood pressure of the pressure medium on the pressure side of the piston will force the lip 21 or 22 outwardly against the inner surface of the cylinder to provide an effective seal therebetween as the piston reciprocates.

Figure 4:
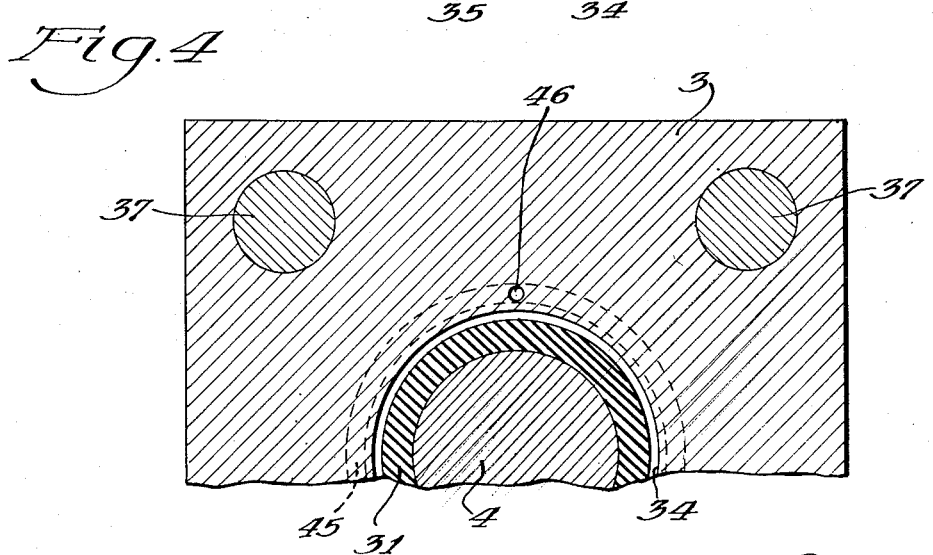
Fig. 4 is a fragmentary sectional view taken along line 4—4 in Fig. 3.

In Figures 3 and 4 there has been indicated the use of a flange seal for sealing the space between the front cylinder head 3 and piston rod 4. This flange seal is similar to the cup seals used on the piston in that a radially extending flange is clamped in the cylinder head and an axially extending skirt contacts the piston rod to form the seal. Herein the terminology "cup seal" has been used as designating either the cup seals of Figures 1 and 2 of the flange seals of Figures 3 and 4.

Both cup seals and flange seals have a radial base which can be clamped for retaining the packing in position. On cup seals, the outer periphery of the radial base is extended perpendicular to the radial base for sealing against an outer fluid confining wall, such as a cylinder tubing.

On flange seals, the inner periphery of the radial base is extended perpendicular to the radial base for sealing against an internal fluid confining wall, such as a piston rod.

As illustrated therein a flange seal 30 has a lip portion 31 extending in the direction of the piston rod 4 and a radially extending portion 32 which is used to clamp the flange seal in place by forcibly securing a piston rod bushing 33 against the portion 32 of the seal. The cylinder head 3 is appropriately formed with an annular recess 34 having a radially extending portion 35 to accommodate the flange seal. A metal clamp ring 36 hold the bushing 33 tightly against the radial portion 32 of the flange seal and is secured by the cylinder bolts 37.

A dirt wiper 38 and an oil wiper 39 may be positioned in the bushing if desired. However, these wipers form no part of the present invention.

The flange seal is similar to those disclosed in connection with Figures 1 and 2. A tip portion 41 of the flange seal actually contacts the piston rod 4 and provides the sealing effect. A metal ring 42 has a surface facing the seal beveled at a greater angle than the bevel of the tip portion 41 and is pressed toward the base of the flange by a wave spring 43. This forces the tip of the flange seal into contact with the piston rod.

The present flange seal has been altered slightly from those shown in Figures 1 and 2 by cutting off the outer periphery of the base portion to a beveled surface 44 as illustrated in Figure 3. By so cutting the base of the seal, an annular space 45 about the periphery of the base portion 32 is provided. A small drilled hole 46 makes this space with the fluid opening 47 which communicates with the interior of the cylinder 1. When fluid under pressure is admitted through the fluid passage 47, part of that fluid is conducted to the base of the flange seal and extends around the base through the annular space 45. When this pressure is released, there can be no accumulation of pressure in the space 45 since the drilled hole 46 will relieve the pressure. The relief passage thus provides balanced hydraulic pressures to prevent distortion when the packing or seal does not fill its cavity concentrically. Thus, also a cup type or flange seal may be used between the piston rod and cylinder head as well as on the piston itself. It should be understood that while the use of flange seals has been illustrated in connection with a reciprocating device that the invention would be equally applicable to sealing the space between a stationary member and a rotating shaft.

The foregoing detailed description is given for clearness of understanding only, and no unnecessary limitations should be understood therefrom, for some modifications will be obvious to those skilled in the art.

I claim:

1. In a piston assembly adapted to be reciprocally mounted in a high pressure cylinder, a piston rod, a piston disk and a pair of followers one on each side of the disk fixed as a unit to said rod, a pair of annular piston cup seals each having a base extending radially inwardly between the disk and its respective follower and clamped between a follower and the adjacent side face of the disk, and means including a space at the inside diameter of the cup seal base vented to the near side of the piston for preventing propelling medium pressure from the high pressure side of the piston assembly from blowing out the cup seal on either side of the piston assembly, each of said followers throughout its length being of substantially less outside diameter than the outside diameter of said disk.

2. In a piston assembly adapted to be reciprocally mounted in a high pressure cylinder, a piston rod, a piston disk and a pair of followers one on each side of the disk fixed as a unit to said rod, a pair of annular piston cup seals each having a base extending radially inwardly between the disk and its respective follower and clamped between a follower and the adjacent side of the disk, said followers each being formed with an opening connecting the inside diameter of the radially extending base of the cup seal with the opposite side face of the follower to relieve any pressure that might accumulate behind either of said cup seals, and each of said followers throughout its length being of substantially less outside diameter than the outside diameter of said disk.

3. A piston assembly as claimed in claim 2 in which each of the followers is formed at the bottom of the radially extending portion of the cup seal base with an annular groove in communication with said opening of the respective follower.

4. In a piston assembly adapted to be reciprocally mounted in a high pressure cylinder, a piston rod, a piston disk having a follower disk mounted on one side thereof, said piston and follower disk being fixed as a unit on said rod, a cup seal having a base extending radially inwardly between the piston disk and the follower disk and clamped between said follower and the adjacent face of the piston disk, the piston assembly adjacent said base having a collecting channel at the inner edge of the radially extending portion of the cup seal and a relief opening leading from said channel to the outer face of the follower disk to relieve pressure from the base and prevent the cup seal from blowing out.

5. In a piston assembly, a piston rod, a piston disk on said rod, followers on said rod one on each side of said piston disk and clamped thereto, each of said followers being of less outside diameter than the outside diameter of the disk, the radially outer marginal edge portion of each of said followers on the side adjacent said disk having an annular recess extending around the follower face, a pair of annular cup seals each having a radially inwardly extending base flange seated in one of said annular recesses and a lip pressure member extending longitudinally of the piston rod along the outer circumferential face of its follower in a direction away from the disk, each of said followers having an opening leading from the inside edge of the base flange to and through the opposite side face of the follower to relieve any pressure that might have accumulated behind the base flange when that respective follower was subjected to high pressure in the cylinder, to prevent blowing out the cup seal.

6. A piston assembly as claimed in claim 5, in which each of said followers is formed with an annular collecting channel immediately underneath the inside diameter of said base flange, said collecting channel being in communication with said opening in that respective follower.

7. In a piston assembly, a piston rod, a central piston disk on said rod, followers on said rod one on each side of said piston disk, the outer marginal edge of each of said followers on the side adjacent said disk having an annular recess, a pair of annular cup seals each having a radially inwardly extending base seated in one of said annular recesses and a portion extending longitudinally of the piston rod, said followers each having an annular space at the base of the cup seal vented to the outer face of the follower, a sealing ring between said piston rod and piston disk, each of said followers throughout its length being of less outside diameter than the inside diameter of said longitudinally extending portion of its respective cup seal.

8. In a piston assembly adapted to be reciprocally mounted in a high pressure cylinder, a piston rod, a piston disk and a pair of followers one on each side of the disk, said disk and followers being mounted directly on the piston rod with usual assembly clearances, each of said followers throughout its length being substantially less outside diameter than the outside diameter of said disk and each having an annular radially extending recess on the side adjacent the disk and outwardly spaced from the piston rod, a pair of annular cup seals each having a radially inwardly extending base seated in one of said annular recesses and a portion extending longitudinally of the piston rod, the base of said cup seals being spaced radially outwardly from the piston rod and a sealing ring between the piston rod and piston disk preventing application of cylinder pressure from one side of the piston through said assembly clearances to the base of the cup seal on the opposite non-pressure side of the piston.

9. In a piston and cylinder device having a piston and rod reciprocally mounted in a high pressure cylinder, a pair of cup seals mounted on the piston for slidingly supporting the piston in the cylinder, each cup seal having an annular base portion extending generally radially and a generally cylindrical portion extending longitudinally of the cylinder from the periphery of the base portion for sliding contact with the cylinder; clamping members on said piston for gripping the base portion of the cup seals to secure the seals to the piston, said piston being formed with an annular space at the inner periphery of each cup seal base portion and a pressure venting passage connecting said annular space with the adjacent side of the piston preventing application of cylinder pressure on one side of the piston to the base of the cup seal on the opposite non-pressure side of the piston.

10. In a piston and cylinder device having a piston and rod reciprocally mounted in a high pressure cylinder, a flange seal secured in one part of the device for sealing a space between relatively movable parts of the device, said flange seal being generally L-shaped in section and having a generally cylindrical lip portion extending longitudinally of the rod and cylinder for sliding sealing engagement between relatively movable parts of said device and an annular radially extending base; means clamping the flange seal base to said one part to hold the flange seal in proper position, said clamping means having a portion to grip the base while exposing the lip portion to fluid pressure; means forming an annular space at the periphery of said base for collecting fluid passing the gripping portion of said clamping means and a pressure relief passage connecting said annular space to the pressure side of the flange seal to prevent accumulation of pressure at the base of the flange seal, said annular space and relief passage permitting equal fluid pressure on both the lip portion and base of the flange seal.

11. A piston and cylinder device as specified in claim 10 wherein said flange seal is clamped on the cylinder head with said lip portion in sealing engagement with the piston rod, said cylinder head having a fluid port opening to the interior of the cylinder and a pressure relief passage connecting the outer periphery of the flange seal base with the fluid port.

12. A piston and cylinder device as specified in claim 10 wherein said flange seal is clamped on the cylinder head with said lip portion in sealing engagement with the piston rod, said cylinder head having a pressure relief passage connecting the outer periphery of the flange seal base with the interior of the cylinder.

References Cited in the file of this patent

UNITED STATES PATENTS

| | | |
|---|---|---|
| 1,508,264 | Armentrout | Sept. 9, 1924 |
| 2,115,383 | Christensen | Apr. 26, 1938 |
| 2,332,763 | Stewart | Oct. 26, 1943 |
| 2,520,306 | Detweiler | Aug. 29, 1950 |
| 2,587,091 | Barnes et al. | Feb. 26, 1952 |
| 2,597,829 | Stillwagon | May 20, 1952 |
| 2,615,769 | Barnes et al. | Oct. 28, 1952 |

FOREIGN PATENTS

| | | |
|---|---|---|
| 333,029 | Germany | Feb. 14, 1921 |